United States Patent [19]

Micke et al.

[11] Patent Number: 5,460,434
[45] Date of Patent: Oct. 24, 1995

[54] BRAKING DISTRIBUTION SYSTEM FOR A MULTI-AXLE VEHICLE MAKING ALLOWANCE FOR BACKGROUND BRAKING

[75] Inventors: Sigmar Micke, Koblenz, Germany; Malcolm Brearley, Solihull, England

[73] Assignee: Lucas Industries Public Limited Company, Solihull, England

[21] Appl. No.: 211,425
[22] PCT Filed: Dec. 22, 1992
[86] PCT No.: PCT/GB92/02378
 § 371 Date: Apr. 7, 1994
 § 102(e) Date: Apr. 7, 1994
[87] PCT Pub. No.: WO93/12962
 PCT Pub. Date: Jul. 8, 1993

[30] Foreign Application Priority Data

Dec. 24, 1991 [GB] United Kingdom .................. 9127343
Feb. 17, 1992 [GB] United Kingdom .................. 9203298

[51] Int. Cl.⁶ .............................. B60T 8/32; B60T 8/00
[52] U.S. Cl. ........................... 303/9.62; 303/3; 303/15
[58] Field of Search ............................ 303/3, 4, 7, 8, 303/9.66, 9.73, 15, 20, 25, 95, 103; 180/197

[56] References Cited

U.S. PATENT DOCUMENTS

| | | | |
|---|---|---|---|
| 3,829,167 | 8/1974 | Rouf et al. | 303/93 |
| 3,838,892 | 10/1974 | Davis et al. | 303/106 |
| 4,712,839 | 12/1987 | Brearley et al. | 303/3 |
| 4,795,219 | 1/1989 | Brearley et al. | 303/9.69 |
| 5,004,299 | 4/1991 | Brearley et al. | 303/15 |
| 5,080,445 | 1/1992 | Brearley et al. | 303/15 X |
| 5,295,736 | 3/1994 | Brearley et al. | 303/7 |

*Primary Examiner*—Josie A. Ballato
*Attorney, Agent, or Firm*—Oblon, Spivak, McClelland, Maier & Neustadt

[57] ABSTRACT

An electronically controlled braking system wherein improved braking distribution in a multi-axle vehicle is achieved by making allowance for sources of background braking by assessing through measurement the total background braking force and assigning this in a predetermined proportion between the vehicle axles.

13 Claims, 7 Drawing Sheets

FIG. 5

TEST THE "NORMALIZED BACKGROUND DECEL STORED" FLAG

↓

SET ? —NO—→

↓ YES

READ VEHICLE SPEED & USE THIS TO ADDRESS THE FALL-OFF. LOOK-UP TABLE.
READ THIS FACTOR & MULTIPLY BY THE STORED NORMALIZED BACKGROUND DECEL'N TO GIVE THE EQUIVALENT DECELERATION FROM BACKGROUND SOURCES AT CURRENT SPEED.
FROM THE TOTAL VEHICLE WEIGHT CALCULATE THE BACKGROUND BRAKING FORCE.
FROM THE BACKGROUND BRAKING FORCE $F_{BK}$ SUBTRACT FRONT CONSTANT FORCE $F_{FO}$ PRE-STORED FOR THE VEHICLE.
FOR THE REMAINDER CALCULATE THE EQUIVALENT BRAKING PRESSURE AT THE REAR AXLE USING THE REAR BRAKE CONSTANT --- $F_{Br}$.
FROM THE FRONT FORCE $F_{FO}$ CALCULATE THE EQUIVALENT FRONT AXLE BRAKING PRESSURE USING THE PRESET FRONT BRAKE CONSTANT --- $P_{Br}$.
STORE THESE FIGURES AS EQUIVALENT BACKGROUND PRESSURES FOR EACH AXLE $P_{Bf}$, $P_{Br}$.

↓

READ PEDAL DEMAND AND SUBTRACT ZERO CAL.
TEST RESULT FOR ZERO.

↓

ZERO ? —YES→ OUTPUT ZERO PRESSURE DEMANDS TO CONTROL LOOPS

↓ NO

FOR FRONT AXLE READ DYNAMIC AXLE LOAD & MULTIPLY THIS BY DEMAND.
MULTIPLY THIS BY PRESSURE CONSTANT (bar/tonne/g).
FOR REAR AXLE REPEAT ABOVE PROCESS USING REAR FIGURES.

↓

SUBTRACT FROM FRONT RESULT THE FRONT EQUIVALENT BACKGROUND PRESSURE.
SUBTRACT FROM REAR RESULT THE REAR EQUIVALENT BACKGROUND PRESSURE.

↓

OUTPUT THE FRONT RESULT AS THE FRONT DEMAND PRESSURE TO THE FRONT PRESSURE CONTROL LOOP

↓

OUTPUT THE REAR RESULT AS THE REAR DEMAND PRESSURE TO THE REAR PRESSURE CONTROL LOOP

↓

END OF ROUTINE

BRAKING DISTRIBUTION SYSTEM FOR A MULTI-AXLE VEHICLE MAKING ALLOWANCE FOR BACKGROUND BRAKING

BACKGROUND OF THE INVENTION

The present invention relates to a means for obtaining improved braking distribution in vehicle braking systems, whether electronically controlled or mechanical.

The curve governing the relationship between axle braking for a two-axle vehicle is well known but does not take into account other sources of braking which would cause vehicles to come virtually to rest without friction brakes being employed. Such other sources of braking are primarily frictional losses in rotating parts and, more importantly, engine braking. Many heavy vehicles have means of increasing engine braking or have some form of retarder, in the form of an additional type of endurance brake which acts on the driving wheels. In such vehicles in particular, the use of combined braking seriously unbalances the braking distribution away from the ideal in which utilization of adhesion between axles is equal. In conventional vehicles, efforts are made to obtain good distribution of foundation (friction) braking but the additional braking sources generally represent an option or an afterthought and are in no way integrated into an overall braking system for the vehicle.

In a Brake-by-Wire or Electronic Braking System, electronic controls are provided in the combined braking scheme which, of course, uses electrical signalling, in order to make braking distribution near to the ideal so as to improve safety in braking. Such a system has therefore to include some level of integration of the sources of braking. This may be the full integration of a blended braking system or the lesser integration of an interlinked system in which the foundation brake controls make suitable allowance for other sources of vehicle braking— referred to hereinafter as background braking—in order to achieve a more ideal braking distribution in actuality. It is this latter type of braking system which is the subject of the present invention.

It is recognised as impossible to measure all the sources of background braking because the sources are distributed and often quite small and, as such, sensors are not available to measure the effects of what is often losses and subject to relatively significant disturbances during vehicle movement. However, it is possible to measure some of the sources of background braking directly, such as driveline torque. It is also possible to measure the combined effect of all the sources of background braking in the deceleration which is produced on the vehicle and from a study of typical vehicles to allocate this effect between axles.

SUMMARY OF THE INVENTION

Thus, in accordance with the present invention in its broadest aspect, there is provided a method and apparatus for achieving improvements to braking distribution in a multi-axle vehicle having a controlled braking system, wherein allowance is made for selected sources of background braking by assessing through measurement the corresponding background braking force and assigning this in a predetermined proportion between the vehicle axles.

In one embodiment, for example, the selected source can be the driveline torque which can be measured directly and the corresponding background braking force assessed.

However, it is presently preferred to assess the total background braking force by its resultant effect on the vehicle performance, namely its decelerating effect. This assessment can therefore be made by measurement of the deceleration of the vehicle at a time when the vehicle is not being driven forward and the foundation brakes are not being applied, that is, by measurement of the total vehicle rolling deceleration.

The deceleration effect is measured using a vehicle borne decelerometer, which is zeroed when level in order to obtain a figure which is compensated for gradient changes.

Of the background braking contribution which is thus allocated between axles, the majority is assigned to the drive axle (usually the rear axle in the case of trucks and heavy vehicles), and the equivalent braking pressure is calculated from the brake factors and the total vehicle mass. These equivalent braking pressures are registered as the distributed background braking levels and are allowed for during the foundation braking application. This automatically accounts for a background offset when the vehicle achieved deceleration and the driver's demand are compared, so that in an adaptive control system, such as that described in our European Patent EP 0205277, the background braking is prevented from wrongly adapting the brake pressure constant.

The background braking level is preferably measured from a filtered deceleration signal which, because of the time constant of the filter, typically of the order of 2 seconds, is slightly delayed and not subject to serious disturbances resulting primarily from suspension movements. This signal is generated continuously and is preferably sampled just after the brake pedal is pressed so that it represents the background retardation just before foundation braking commences. The signal is normalised to a preset maximum speed and stored for use throughout the stop. As the speed falls, the deceleration caused by background sources also falls and a typical fall off curve is programmed into the brake system controller. Thus at each pressure setting cycle, a decaying background deceleration can be calculated and used as follows:

a. The calculated deceleration is split into 2 axle components after it is converted into an equivalent braking force by multiplying it by the total vehicle weight. The front axle component is formed by taking a preset small percentage of the total braking force and the remainder is assigned to the rear axle.

b. Each axle force is related to an equivalent braking pressure from the following expression $$PBA = \frac{FBA}{KBA}$$

where
FBA=Axle Braking Force
KBA=Axle Brake Const Force/Bar c. The background retardation equivalent axle pressures are assumed to be acting before the application of foundation braking and so, when braking pressures are calculated, they are reduced by components $PB_f$ and $PB_r$ before being applied to the pressure control loops.

Thus, in a preferred arrangement in accordance with this invention, the background braking level is arranged to be reduced in a pre-programmed manner as the vehicle speed falls. Furthermore, the measurement of background vehicle deceleration is preferably made just after the first pedal movement whenever the foundation brakes are applied, ant stored for use throughout the stop.

Advantageously, the measured figure is normalised to a predetermined preset maximum speed for the vehicle and this stored figure on each stem is reduced as the vehicle speed falls on the basis of a speed fall-off ratio table.

In one preferred arrangement, falling background deceleration is converted into braking force, allocated between axles in a pre-programmed ratio and converted into background braking pressures which are subtracted from each corresponding axle braking pressure calculated to meet the driver's braking demand.

BRIEF DESCRIPTION OF THE DRAWINGS

The invention is described further hereinafter, by way of example only, with reference to the accompanying drawings, in which:

FIG. 5 is the flowchart which shows the equivalent background pressure calculation and how this links with the main pressure calculation routine which is continuously performed at defined intervals;

DETAILED DESCRIPTION OF THE PREFERRED EMBODIMENT

Figure 1:
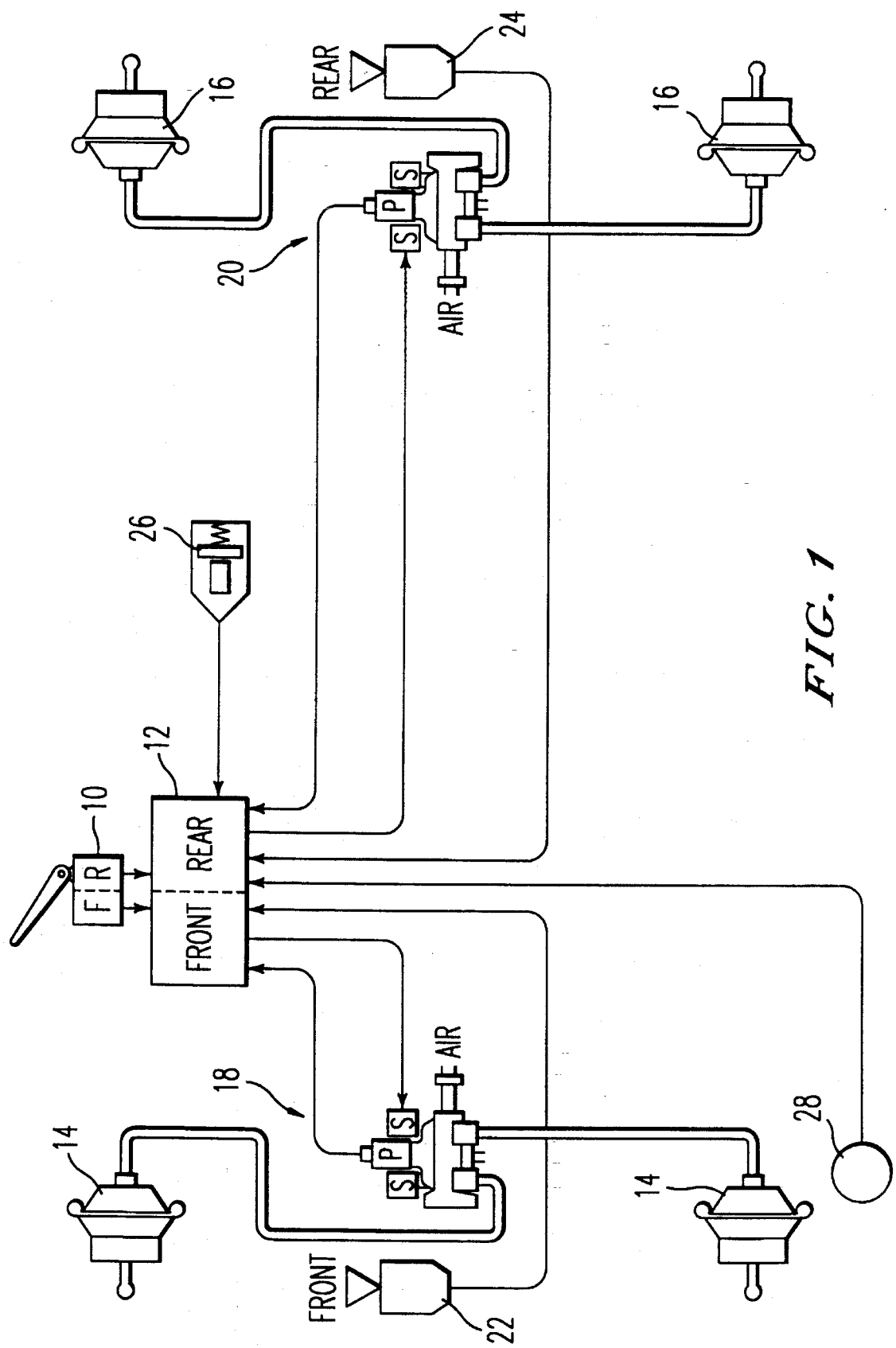
FIG. 1 is a diagrammatic illustration of a typical electronically controlled braking system (EBS) to which the present invention can be applied.

The background to the development of the present invention is first considered.

The fundamental basis of every past and new vehicle calculation regarding braking or traction has been and currently still is the "ideal tangential force diagram", based on the publication by Tönnies, C., ATZ 1955, Issue 8 in 1955, v. Glassner published on the subject in 1973. This diagram describes what it says, that is an ideal condition of dynamic load transfer between the axles, caused by ideal and pure braking forces by the wheel brakes, or traction forces acting on the vehicle.

Current practice is that a small family of extreme dynamic borderline conditions are selected, based on their minimum and maximum load distribution, together with their assumed heights of centre of gravity, in order to represent all dynamic vehicle situations in straight line braking and traction. With this information, the relevant ideal tangential force diagram is calculated and drawn.

Into this family of ideal dynamic tangential force curves a fixed, linear braking distribution is calculated, in most cases with reducing or limiting value functions at different cut in points.

The gap between the fixed lines of braking distribution and the relevant ideal curves indicates the loss in tire to road utilisation, i.e. the front or rear wheels lock earlier than the coefficient of adhesion they are rolling on. Utilisation influences stopping distance; stopping distance increases linearly with reduced utilisation.

In order to utilise the tire to road friction coefficient fully and to achieve therefore the shortest possible stopping distance, when needed, the aim must be to obtain, on all wheels simultaneously, a tire to road utilisation as close to 100% as possible. The implications of this are:

1. A non linear, "fixed" braking distribution has to be used.
2. The "fixed", non linear braking distribution must be adaptable to changing vehicle and road conditions.

It has been noted during vehicle testing, that certain test results of maximum achievable vehicle deceleration did not comply with data sheet predictions based on the conventional ideal tangential force curve. The biggest discrepancies are during tests with Anti Lock Braking systems on individual axles. Utilisation values in excess of 125% can be calculated during such tests made according to current regulations.

However, any utilisation value in excess of 100% clearly indicates inherent flaws of the theory and strategy in use.

The ideal tangential braking force curve does not take into consideration other factors, which cause vehicle retardations. In addition to the working brakes, there are: engine braking; retarder systems; exhaust braking; downwards gear changing; frictional bearing losses; residual torque due to dragging brakes; losses due to tire work; different acting ratios between front and rear axle on four wheel drive vehicles; different axle loading due to aerodynamic forces; and different threshold pressures between front and rear brakes, resulting in premature braking of one axle, or even one brake during brake application, etc.

A number of attempts have been made over the years (v. Glassnet, E. C. Dissertation, UNI Stuttgart, 1973 and Hörz, E./Illg, V., The tangential braking force diagram and its use in the reconstruction of traffic accidents, DAT-Seminar, 1984, Frankfurt) to solve this task, but practically all of them have tackled the problem by parallel shift of the coordinate system for the fixed braking distribution in relation to the ideal tangential braking force curve. It has been assumed in these attempts, that the changing conditions of a vehicle have to be described in a number of different coordinate systems with different points of origin. It has been furthermore assumed, that other retardation forces, e.g. forces caused by engine braking, are linear constants in relation to the ideal tangential braking force curve, and have no influence on the ideal curve itself.

All previous proposals simply change the position of the linear, fixed braking distributions within the coordinate system and compare it with the ideal tangential braking force curve for effectiveness.

Therefore a new strategy has been sought and developed by the present Applicants based on straight line braking, which reflects all possible vehicle conditions. The new strategy builds on and takes into account the existing tangential braking force diagram and uses the same coordinate system.

As a baseline it is important to review the relevant equations for the known "ideal tangential braking force" diagram.

In equation 1, front axle braking force over vehicle weight is given by $$\frac{B_F}{P} = k \cdot \left( \frac{P_1}{P} + \frac{h}{l_E} \cdot z \right) \qquad 1.$$

or $$\frac{B_F}{P} = k \cdot \left( \frac{l_{RA}}{l_E} + \frac{h}{l_E} \cdot z \right) \qquad 2.$$

where k equals z in numerical value. Equation 3. is valid for the rear axle braking forces over vehicle weight, $$\frac{B_R}{P} = k \cdot \left( \frac{P_2}{P} - \frac{h}{l_E} \cdot z \right) \qquad 3.$$

or $$\frac{B_R}{P} = k \cdot \left( \frac{l_E - l_{RA}}{l_E} - \frac{h}{l_E} \cdot z \right) \qquad 4.$$

where k equals z in numerical value.

The formulae 1., 2., 3. and 4 are describing an ideal tangential braking force curve, which obviously is a parabola. This parabola represents the ideal case of maximum and identical tire to road utilisation on all of its points, with the achievable vehicle deceleration being identical to the available tire to road coefficient of adhesion.

What has been missing up to now in current practice is the reflection in the formulae of the practical disturbances, such as engine braking, retarder forces, frictional losses etc. All of those factors cause vehicle retardations, and their recognition in the theoretical basis for future, optimised braking systems is a primary aim of the present invention.

Any braking or traction system is only as good as its theoretical basis will permit. A largely optimised braking system is only possible and feasible, if the braking STRATEGY in use is CORRECT.

It is essential to understand that vehicle decelerations may be created by all sorts of individual forces, some of which are independent of the brakes and possibly act in parallel or in addition.

One may consider, by way of example, the following scenario:

A rear axle driven vehicle is cruising at speed on a country road.

Both axles, front and rear, have different, qualifiable frictional losses in their axle bearings.

The tires on the front axle are inflated to a different pressure than the rear tires and generate therefore a different rolling resistance due to different tire work per axle.

The driver takes his foot off the accelerator pedal and applies, via a hand valve, a hydraulic or electromagnetic retarder.

Whilst he has taken his foot off the accelerator pedal, the vehicle speed may reduce due to retardation via gear box and engine braking.

The retarder system installed acts via drive shaft and differential onto the rear axle and causes vehicle deceleration.

The vehicle may have no retarder system installed, and the driver decides to reduce the vehicle speed by changing down in gear.

Immediately after the gear change the brake pedal may be applied by the driver, in order to bring the vehicle to rest, or The driver has to apply his brakes in an emergency because of some traffic condition.

Certainly this is a complex situation but it is nevertheless a day to day traffic condition probably known to practically all drivers. The important point is, that all of the listed conditions have one seemingly unrecognised fact in common:

All of the conditions cause "other" inner dynamic forces, which reduce the vehicle speed. Reduction in vehicle speed is caused by vehicle deceleration. Vehicle deceleration implies dynamic weight transfer.

Dynamic weight transfer on road vehicles is therefore not just caused by conventional braking forces, but is caused as well by a number of other background forces. "True optimal" tangential braking force distribution is a novel term of definition, which provides a better distinction when compared to the misleading expression "ideal tangential braking force distribution". The "true optimal distribution" is the dynamic tangential braking force distribution, which reflects all individual decelerations acting on the vehicle.

The true optimal tangential braking force distribution distinguishes in deceleration terms between:

$\Delta Z \rightarrow$ vehicle deceleration via front and rear axle, caused by all wheel brakes applied in parallel, $z_{i.1} \rightarrow$ vehicle deceleration via the front axle, caused by inner forces other than the purposely applied brakes, $z_{i.2} \rightarrow$ vehicle deceleration via the rear axle, caused by inner forces other than the purposely applied brakes, All inner retardation forces on the vehicle other than the purposely applied brakes, for example from retarders, rolling resistance, gear change, engine or exhaust brake, dragging brakes etc., can be assigned to either the front or rear axle. These front or rear axle forces will cause vehicle decelerations, which are the ones referred to in the stated vehicle decelerations $z_{i.1}$ via the front axle and $z_{i.2}$ via the rear axle.

These research results can be described in generic form by the following novel dynamic equations 5., 6., 7. and 8. :
Equation 5. describes the true optimal FRONT AXLE braking force over vehicle weight, $$\frac{B_F}{P} = z_{i.1} + \Delta z \cdot \left( \frac{P_1}{P} + (z_{i.1} + z_{i.2} + \Delta z) \cdot \frac{h}{l_E} \right) \qquad 5.$$

or $$\frac{B_F}{P} = z_{i.1} + \Delta z \cdot \left( \frac{l_{RA}}{l_E} + (z_{i.1} + z_{i.2} + \Delta z) \cdot \frac{h}{l_E} \right) \qquad 6.$$

Equation 7. is valid for the true optimal rear axle braking force over vehicle weight, $$\frac{B_R}{P} = z_{i.2} + \Delta z \cdot \left( \frac{P_2}{P} - (z_{i.1} + z_{i.2} + \Delta z) \cdot \frac{h}{l_E} \right) \qquad 7.$$

or $$\frac{B_R}{P} = z_{i.2} + \Delta z \cdot \left( \frac{l_E - l_{RA}}{l_E} \right)\left( z_{i.1} + z_{i.2} + \Delta z \cdot \frac{h}{l_E} \right) \qquad 8.$$

The tire to road surface coefficient of adhesion k, on which the total vehicle is moving with both front and rear axle, is now numerically identical with the sum of braking force deceleration plus inner force deceleration of the vehicle.

For a two axle road vehicle, being braked in parallel on front axle and rear axle according to the true optimal tangential braking force distribution, the total coefficient of road to tire adhesion is therefore defined by:
k→total vehicle coefficient of road to tire adhesion $$k = (z_{i,1} + z_{i,2} + \Delta z) \quad 9.$$

and $$k = z \quad 10.$$

This definition makes sense. If, for example, a gear shift decelerates a rear axle driven vehicle with a defined deceleration, which is part of $z_{i,2}$, together with an additional front axle rolling resistance of $z_{i,1}$ on a given coefficient of adhesion k, the remaining vehicle deceleration due to and required from the brakes is z, in order to reach the locking point at k. Any larger deceleration demand from the brakes would overbrake and lock the rear axle in this case. The total vehicle deceleration can not be larger than the total available coefficient of tire to road adhesion of the vehicle.

The vehicle deceleration caused by each individual axle during the braking process of the vehicle may be different between front and rear axle. The individual axle may contribute therefore differently to the total vehicle deceleration.

The individual coefficient of adhesion, utilised by each axle in the true optimal tangential braking force diagram, can therefore be defined as $k_1$→utilised coefficient of adhesion by the front axle $$k_1 = (z_{i,1} + z) \quad 11.$$

and
$k_2$→utilised coefficient of adhesion by the rear axle $$k_2 = (z_{i,2} + z) \quad 12.$$

Nevertheless, this condition is not to be mixed up with the "split k" condition, during which the one side of both front and rear axle of the vehicle is being braked on a different coefficient of adhesion than the other side. In the "split k" case the locking points of the wheels per vehicle side are different, but the functional line of the true optimal tangential braking force distribution remains unchanged. The braking part of the true optimal tangential force curve in the 1. quadrant of the coordinate system with braking force front axle over vehicle weight $B_F/P$ on the abscissa and braking force rear axle over vehicle weight $B_R/P$ on the ordinate is now clear.

The true optimal tangential force diagram describes on all the points of its family of curves the condition, where the coefficient of adhesion between tires and road surface equals the maximum transmittable vehicle retardation or acceleration.

The vehicle in the quadrant for braking is moving and dynamic. All of the described "inner forces" including the application of the brakes, all the rolling resistance etc. tend to decelerate the vehicle and therefore reduce the vehicle speed. That is the reason why a number of dynamic forces can be identified, which are responsible for the vehicle deceleration in line with the novel formulae.

In the case of vehicle traction (as compared to deceleration), the vehicle may be already moving or it may be stationary, when the driver intends to accelerate the wheels, in order to move the vehicle. None of those forces described in the previous braking part can accelerate the vehicle in addition to the tangential traction forces on the rolling radius of the tires, created at the contact patch between tires and road surface by engine, gear box and transmission. Therefore none of these forces have to be considered in the true optimal tangential force diagram in its traction part.

The proposed formulae 5, 6, 7 and 8., which describe the true optimal tangential braking force distribution curve, consider all vehicle decelerations caused by inner forces, which are attributable to the front or rear axle.

Turning now to FIG. 1, there are illustrated, inner alia, the main components of a conventional electronic braking system (EBS) which is not described in detail herein. Driver's braking demand signals are generated electrically by a treadle-operated transducer arrangement 10 and supplied to an electronic controller 12 where front and rear braking pressures are established and fed to front and rear brake actuators 14, 16 for the "foundation brakes" via respective relay valves 18, 20. The resulting foundation braking pressures depend upon operating parameters of the vehicle determined, inter alia, by front and rear load sensors 22, 24, a vehicle decelerometer 26 and a speed sensor 28.

Figure 2:
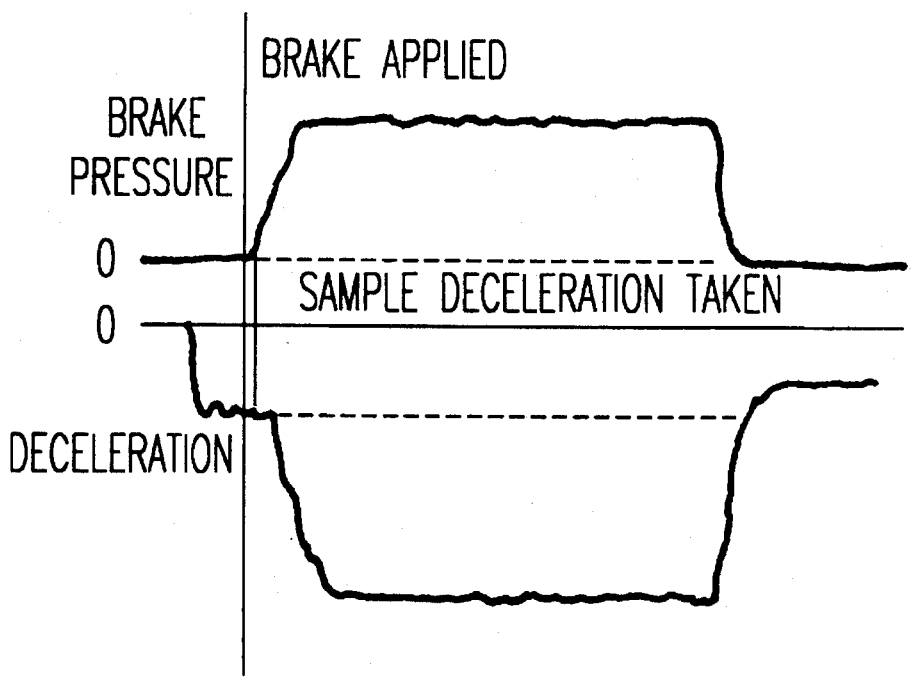
FIG. 2 shows a filtered deceleration signal showing part of a step from which the background deceleration can be measured.

For the purposes of the present technique, the "background braking forces" are assembled from the vehicle deceleration, as measured in the particular embodiment by the decelerometer 26, when the vehicle is not being driven forward and not yet being braked by the foundation brakes 14, 16. The preferred point in time at which to make this background deceleration measurement is just at the point where foundation braking is signalled but before the brake pressures have caused brake forces to be developed. Deceleration measurements are made continuously and are filtered in order to remove noise and this process generates a delay which depends on the time constant of the filter used. With a 1–2 second time constant, for example, the decoloration reading is slightly delayed so that if a sample is taken of the filtered signal as the braking demand signal starts to build up the figure obtained will be the background deceleration which existed just before the pedal was pressed. This, as shown in FIG. 2, is the sample which is stored along with a vehicle speed reading and is used to form the background braking effort which will be used throughout the stop. This background effect does not, however, remain as a constant force but falls with vehicle speed. At a given speed it is also not constant from stop to stop as it depends primarily on which gear is engaged and this is why a starting sample must be taken.

Figure 3:
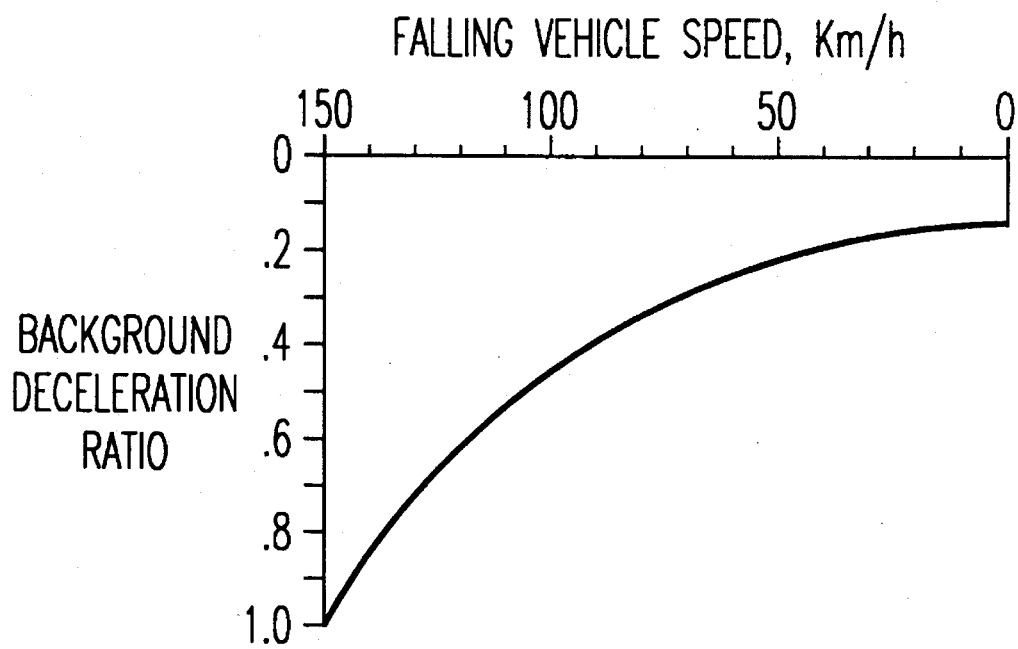
FIG. 3 is a record of typical deceleration variation with speed for a stop on level road.
Figure 4:
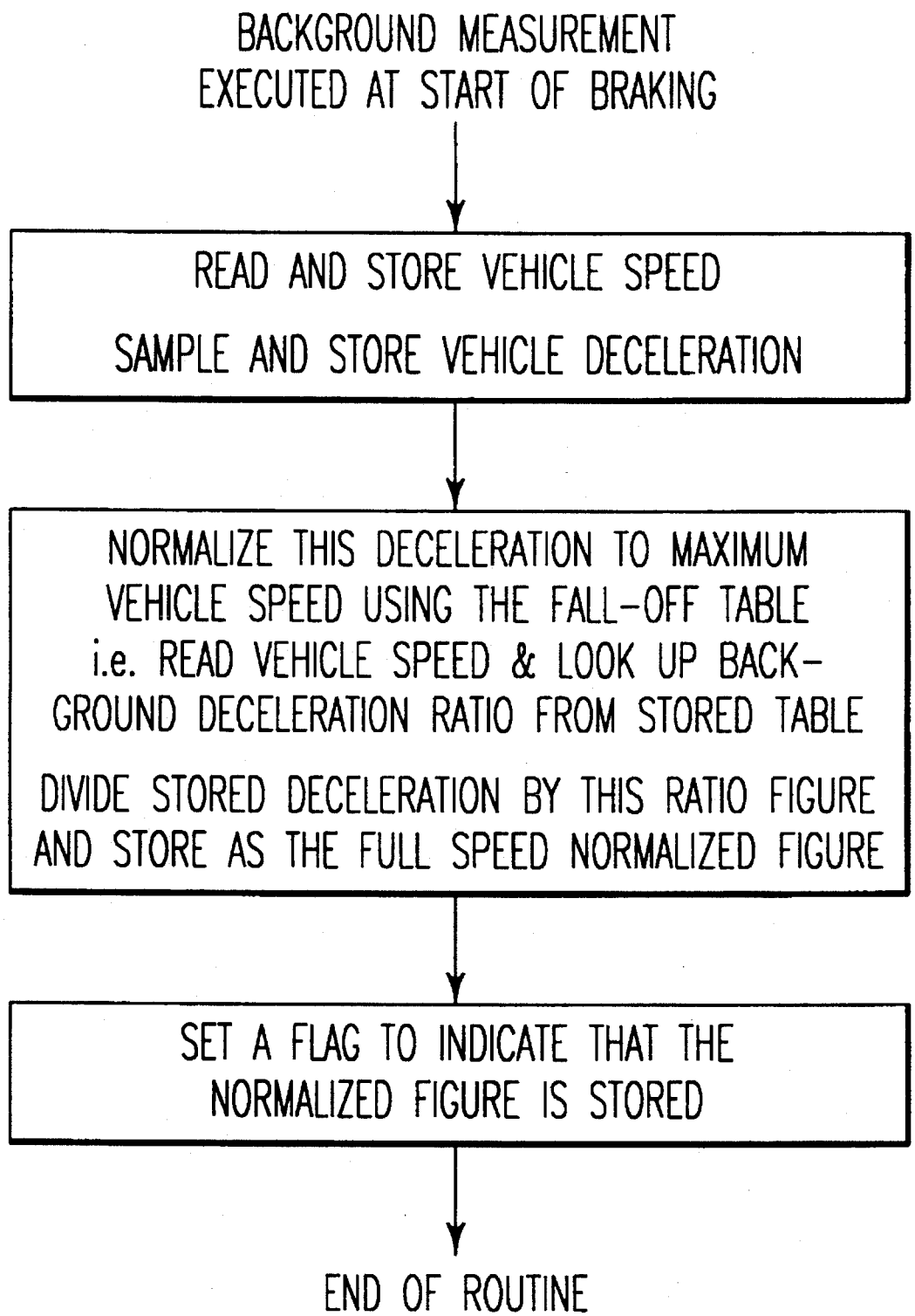
FIG. 4 is a flow chart which shows the derivation and storage of a normalised background deceleration figure.

FIG. 3 shows a typical deceleration fall-off in relation to vehicle speed, obtained in a series of vehicle trials. The graph of fall-off ratio is programmed into the braking controller and is used to predict the deceleration at any speed which results from background braking. To use the ratio, the measured deceleration figure, which is sampled and stored along with the current vehicle speed is normalised to a maximum speed value. This is achieved by looking up the speed factor in a table, which is a digital replica of FIG. 3, and dividing the stored deceleration figure by this factor to give the equivalent deceleration at 150 kmph in the example shown. As this calculation is made and the result is stored as a normalised deceleration, a flag is set to show this and subsequent reference to this figure is made along with a falling ratio factor as the vehicle speed reduces. The process of sampling and normalising is illustrated in FIG. 4 which is executed once only at the start of each stop. The flag which is set in the routine is reset at the end of each stop when the brake pedal is restored.

The calculation of equivalent background pressures and then the axle braking pressures are shown in the flow chart of FIG. 5 which is executed many times per second in order to set the braking pressures in response to what may be changing driver demands. The equivalent background braking pressures are calculated by looking up a fall-off factor based upon the current vehicle speed from the stored table and multiplying this by the stored normalised background deceleration component which can reasonably be assigned to background sources. This component which reduces as the speed falls is divided into front and rear axle components after it is converted into an equivalent braking force FBK by multiplying by the total vehicle weight. A fixed constant small fraction of this force FBK is formed and subtracted to represent the front axle losses and the remainder is assigned to the rear axle using preset brake constants for each axle. The forces are converted to equivalent background braking pressures by dividing them by brake constants for each axle. These pressure results are stored and later will be used to reduce the calculated foundation braking pressures. This process is skipped if the "Normalised Background Deceleration Stored" flag is not set so that the routine is only executed during braking. To set braking pressures, the pedal demand is read and zero-corrected and the route is bypassed if there is no braking demand with axle pressures being held at zero. When braking is demanded, the product of demand and axle load (dynamic) is formed and further multiplied by the pressure constant which scales the result into pressure terms. Thus weight sensitive braking pressures are established for each axle, the appropriate background pressures developed in the previous routing are subtracted and the resulting somewhat reduced pressures are output to the axle pressure control loops.

Figure 6:
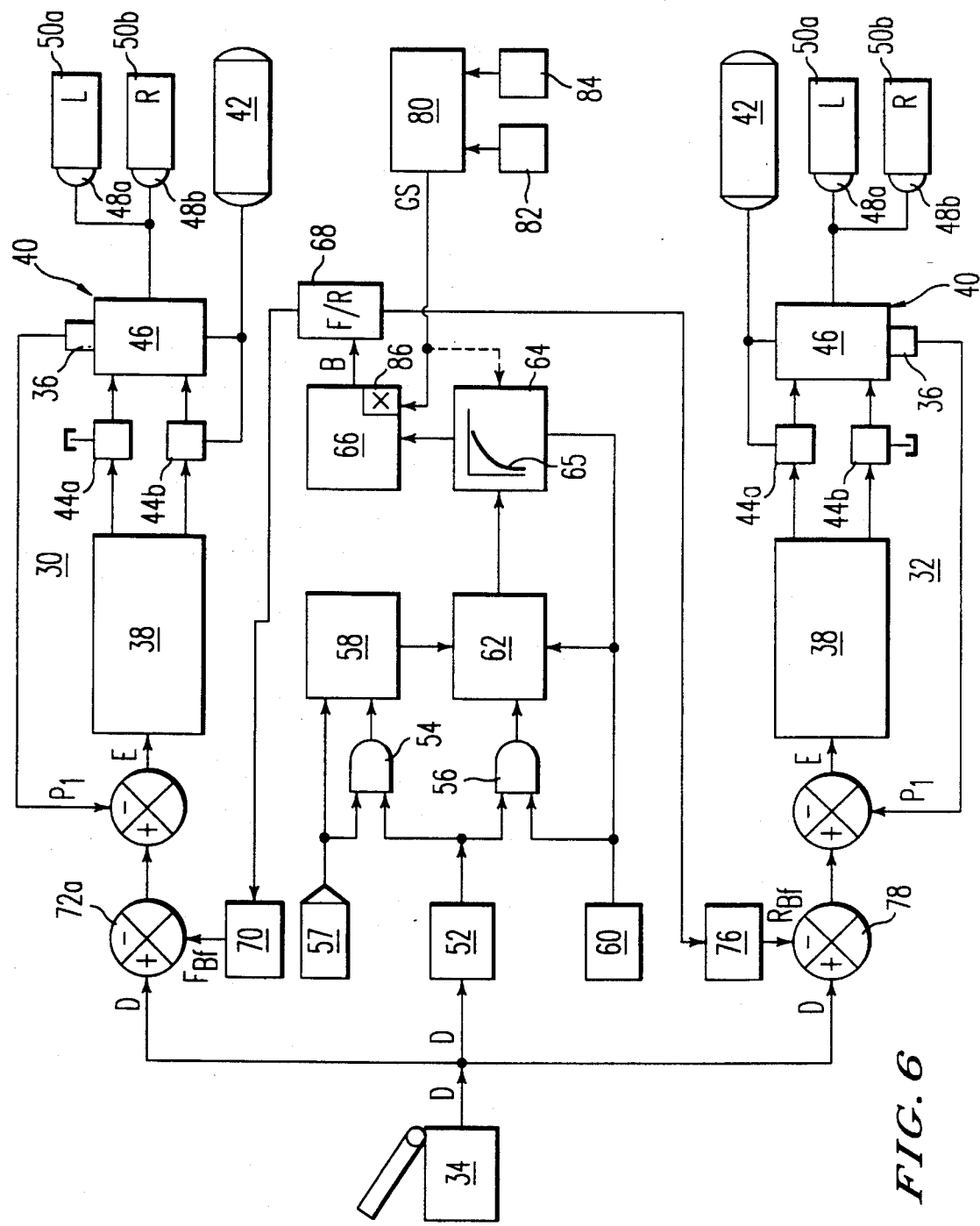
FIG. 6 is a block diagram illustrating one embodiment with the present invention.

Referring now to FIG. 6, there is shown by way of illustration a first embodiment of a braking system utilising the technique of the present invention. This embodiment operates in accordance with the flow chart of FIG. 5 and assesses the total background braking force by measuring vehicle deceleration when the vehicle is not being driven forward and not yet being braked by the foundation brakes.

This system sets and controls braking pressures in response to driver demands by the use of two pressure control hoops 30 and 32, for the front and rear brakes respectively. Each pressure control loop 30, 32 takes an electrical input signal D from a brake pedal transducer 34 which is used to provide a pressure error signal E by comparison with the output signal P1 of a pressure transducer 36, this pressure error E forming the input to a computer-based pressure controller 38 which generates an output signal causing the pressure developed by an electro-pneumatic or electro-hydraulic converter 40 to change in a direction such as to reduce the amplitude of the pressure error E. The converter 40 is supplied by a pneumatic or hydraulic pressure supply 42, as appropriate. The pressure controller 38 employs a pair of solenoid valves 44a, 44b to raise or lower a control chamber pressure by selective energisation of these valves. The converter 40 operates pneumatically in this instance and employs a relay valve 46 which responds to this control chamber pressure and which re-balances into the closed condition when the brake pressures at brake actuators 48a, 48b for left and right-hand brakes 50a, 50b become equal to said control pressure. The aforegoing arrangement of the pressure control loops 30, 32 is well known and needs no further explanation here.

The input demand signal D is also supplied to a pulse generator 52 whose output is passed to one input of a pair of AND gate 54, 56. The other input of the AND gate 54 is connected to the output of a decelerometer 57 which is responsive to the overall deceration of the vehicle. The output of the AND gate 54 is connected to a store 58, which also receives the output of the deceierometer 56 direct. This arrangement enables the deceleration, prevailing immediately before a braking demand is initiated, to be measured and stored. The other input of the AND gate 56 is connected to a vehicle speed sensor 60 so that the prevailing vehicle speed is passed, via the AND gate 56, to a normalisation block 62, which also receives the speed signal direct and the stored deceleration from the store 58, to enable the normalisation step to be effected wherein the measured deceleration figure is normalised to a maximum speed value. This is achieved using a digital look-up table 64 which stores a fall-off curve 65 which is normalised for the maximum vehicle speed. The resulting equivalent deceleration is converted in a background force converter 66 into a signal level B representative of the total background braking effort. In one embodiment, the deceleration assessment is made from the average of readings taken over a preset time period historical to the point at which the brakes are applied.

From this signal B, allowance is made for the distribution between front and rear axles in proportion to a preset constant fraction held in the proportioning device 68 (F/R). The proportioning device 68 produces a first value of background force to be assigned to the front axle and a second value of background force to be assigned to the rear axle, each value being a predetermined fraction of the whole background braking force B. The first value of front background braking force is fed to the front brake factor converter 70 to produce an equivalent front brake pressure to be subtracted from the front brake control demand in subtractor 72a. The second value of front background braking force is fed to the rear brake factor converter 76 to produce an equivalent rear brake pressure to be subtracted from the rear brake control demand in subtractor 78.

The system further includes a gear selector element 80 responsive to engine speed 82 and road speed 84 for selecting an appropriate gear to provide a signal GS representative of the selected gear. The gear selector 80 could, alternatively, be operated manually. The signal GS is passed to a multiplying element 86 in the backaround force converter 66 which provides a multiplying tactor for shifting the curve provided by the look-up table in dependence upon the selected gear. In an alternative arrangement, which is more expensive and so less preferred, the signal GS is passed directly to the look-up table block 64 so as to select a different one of a plurality of stored curves, dependent upon the selected gear.

The operation of the aforegoing system follows the flow chart of FIG. 5.

Whereas the latter system measures the total background deceleration effect by all sources, an alternative strategy is to separately measure one, several or all individual sources of such background deceleration. One principal factor which can be measured directly is the drive line torque, measured for example by a torque transducer positioned around the vehicle prop shaft. Such a system is illustrated in principle in FIG. 7.

Figure 7:
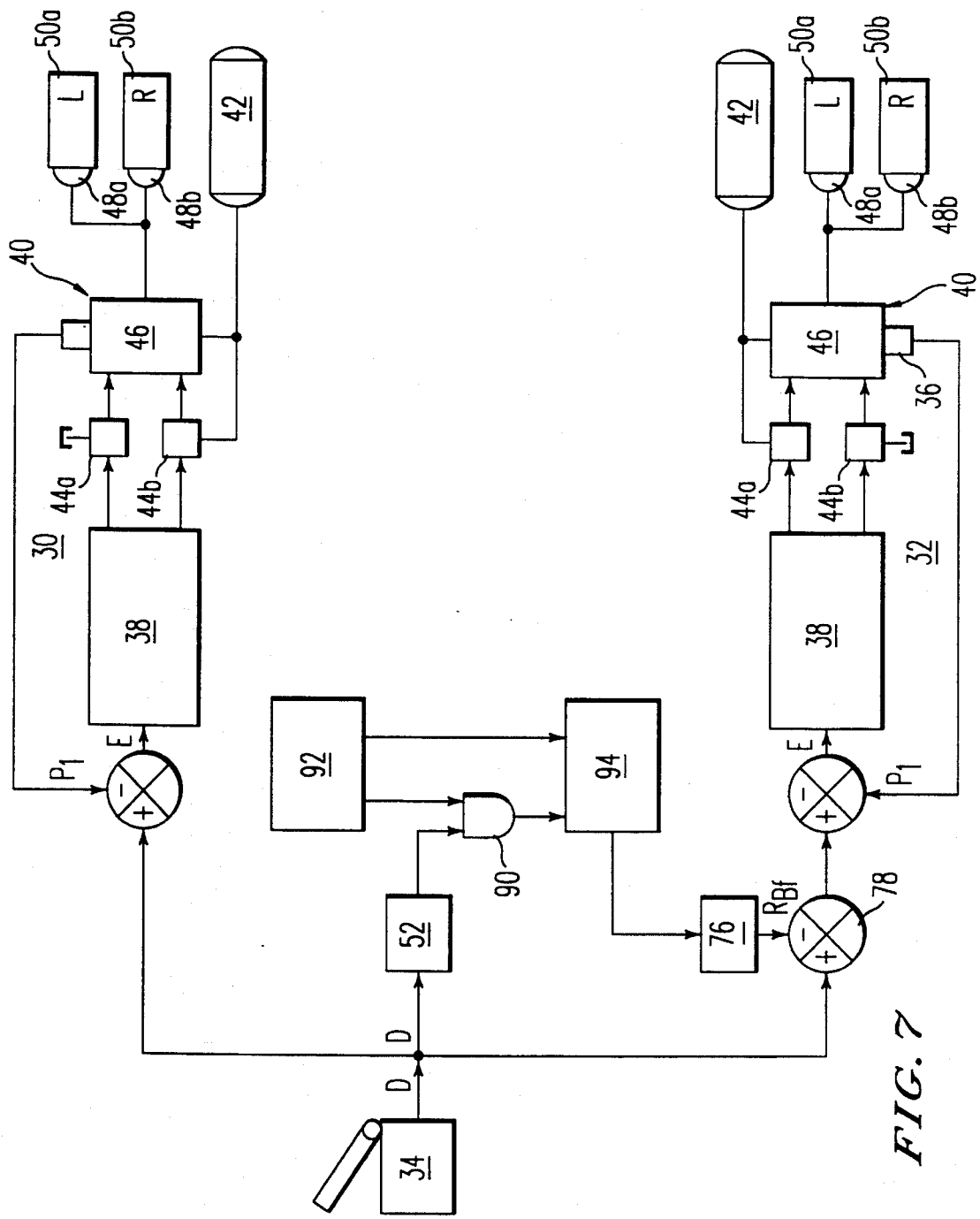
FIG. 7 is a block diagram illustrating a second embodiment of a vehicle braking system in accordance with the present invention.

The system of FIG. 7 again uses the two pressure control loops 30,32 for the front and rear brakes fed with demand signals from the brake pedal transducer 34. Equivalent parts in FIGS. 6 and 7 are given the same reference numerals.

In this case, the output of the pulse generator 52, which indicates the presence of a braking demand D, is passed to one input of an AND gate 90, whose other input comes from the aforementioned torque sensor 92 mounted around the prop shaft. The output of the AND gate 90, and the output of the torque sensor itself, are passed to a unit 94 which provides a signal T representative of the prevailing driveline torque level. This is converted in the element 76 into a rear brake factor RBF for subtraction from the demand signal D before it is applied to the pressure control loop 32 for the rear brakes. In this case, no reduction of the measured driveline torque is made to allow for braking effects (very small) specifically associated with the front axle.

The latter system has the advantage that, since the signal used to generate the rear brake factor RBF is generated continuously during a braking operation from the measured driveline torque, so that no look-up table needs to be established and no account of gear selection needs to be made, can be very simple and (apart from the cost of the torque sensor itself) cheap.

Thus, in a system in accordance with the present invention, the true optimal relations can be used in an electronic braking system to assign the optimal required braking forces on the brakes between the front and rear axles.

In addition to dynamic load measurements on front and rear axles, the true optimal relations will speed up the achievement of optimal tire to road coefficient of adhesions during a stop, if used as reference.

In the case of a four wheel driven vehicle, the gear ratio in use between front and rear axle will determine the useable value of $z_{i.1}$ and $z_{i.2}$.

The true optimum formulae could be used as a reference in the event that only one dynamic axle load is measured.

Figure 8:
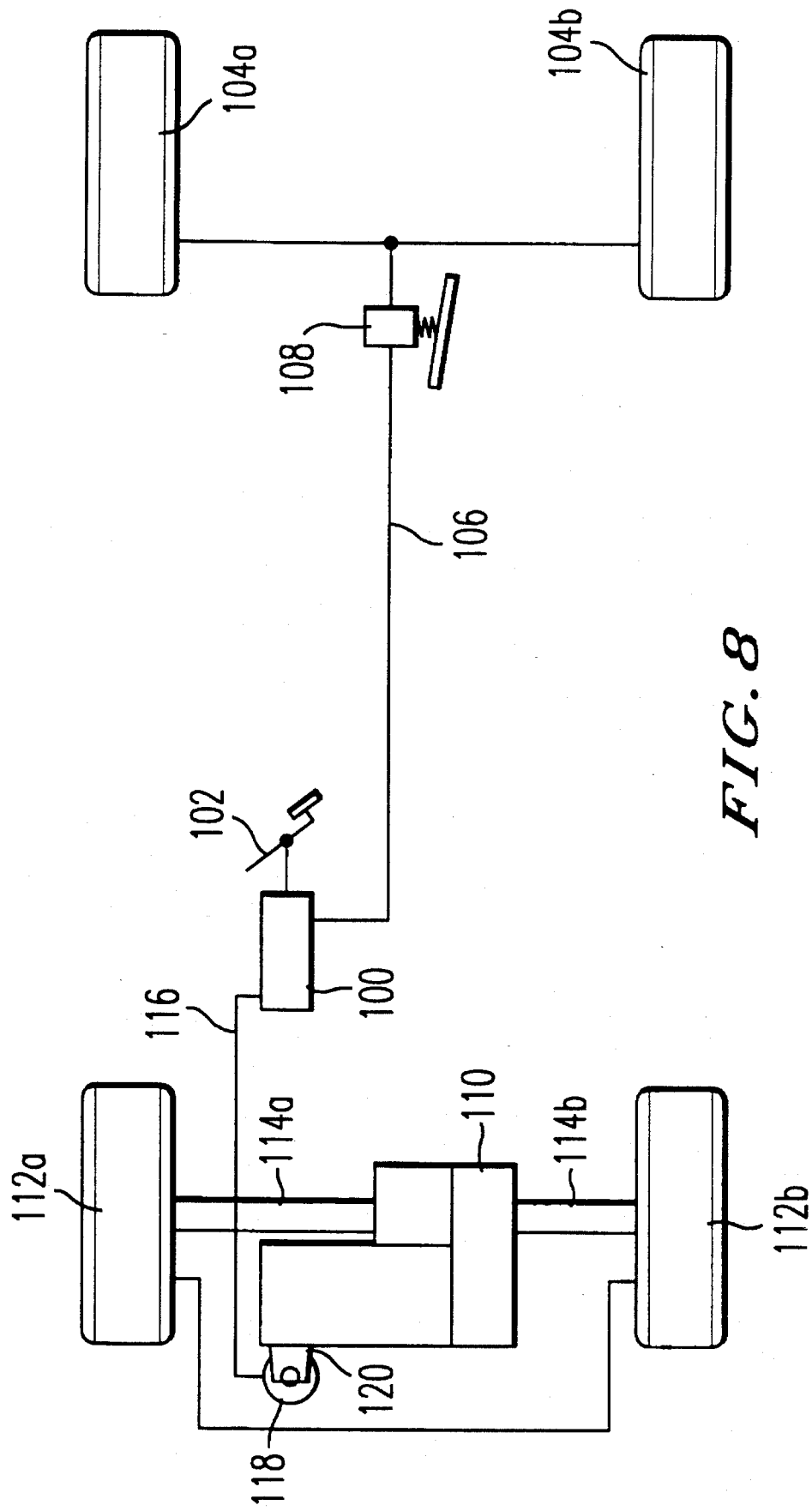
FIG. 8 is a diagrammatic illustration of one way in which the present invention can be applied to a mechanical braking system.

Referring now to FIG. 8, there is illustrated very diagrammatically one way in which the principles of the present invention can be applied to a conventional hydraulic (i.e. non electronic) braking system of the type having a transverse engine and front wheel drive. Reference numeral 100 indicates a conventional master cylinder operated by a foot pedal 102 and providing a front/rear hydraulic split for simplicity of explanation. Thus, the master cylinder 100 supplies hydraulic fluid under pressure via a line 106 to brake cylinders (not shown) at the rear wheels 104a, 104b. Positioned in the hydraulic line 106 is a conventional rear axle, load conscious apportioning valve which adjusts the supply of hydraulic fluid to the rear brakes in dependence upon the load on the rear axle. Reference numeral 110 indicates the engine and gearbox of the vehicle which drives the front wheels 112a, 112b via respective drive shafts 114a, 114b. The front brake cylinders (not shown) are connected to the master cylinder 100 via a hydraulic line 116 which contains a valve 118 which is mounted between the vehicle chassis/frame (not shown) and an engine mounting member 120. The connection between valve 118 and the engine/gearbox 110 is arranged to be such that when the engine is being accelerated or driven at constant speed there is no effect on the valve at all and the valve simply passes the hydraulic fluid from the master cylinder to the front brakes. However, when the engine is on overrun and is acting to decelerate the vehicle, the resulting rotation of the engine about its longitudinal axis is arranged to operate the valve by a corresponding amount whereby the degree of valve closure is dependent upon the level of the overrun torque on the drive shafts 114a, 114b. This arrangement therefore reduces the amount of front wheel braking for a given pedal effort by the vehicle driver when the engine is operating under overrun (deceleration) conditions.

We claim:

1. A system for achieving improvements to braking distribution in a multiple axle vehicle having a controlled braking system which includes foundation brakes operated in response to a foot pedal and which is subjected in use to at least one source of background braking effect which results in the vehicle experiencing a corresponding background braking force, comprising:

means for measuring said background braking force resulting from said at least one source of background braking in the vehicle; and allocation means for dividing said measured background braking force in a predetermined proportion between said multiple axles of the vehicle so that the respective axles are braked in consideration of the divided background braking force.

2. A system according to claim 1, wherein, in order to assess total background braking force on the vehicle, the system includes means for measuring the vehicle deceleration at a time when the vehicle is not being driven and not yet being braked by its foundation brakes.

3. A system according to claim 2, including means for enabling said deceleration measurement to be made at a point where foundation braking is signalled but before the resulting brake pressures have caused any significant brake forces to be developed at said foundation brakes.

4. A system according to claim 3, wherein said means for measuring said background braking force comprises means for measuring vehicle deceleration just after first movement of said foot pedal whenever the foundation brakes are applied and means for storing the measured deceleration level for use throughout a resulting stop.

5. A system according to claim 3, including means for performing said measurement of vehicle deceleration from the average of readings taken over a preset time period historical to the point at which the said foundation brakes are applied.

6. A system according to claim 1, including means for reducing said background braking level, assigned between said multiple axes of the vehicle, in a pre-programmed manner as the speed of said vehicle falls.

7. A system according to claim 6, including means for normalizing, to a preset maximum speed for the vehicle, said measured value for background vehicle deceleration, means for storing said measured value, means establishing a speed fall-off ratio table, and means for reducing the stored value as the vehicle speed falls on the basis of said speed fall-off ratio table.

8. A system according to claim 1, wherein, in order to measure total background braking force on the vehicle, said system includes means for measuring falling background deceleration of the vehicle, the resulting assessed background braking force being assigned by said allocation means between said axles of the vehicle in said predetermined proportion, and wherein said system further comprises means for converting said assigned braking forces into background braking pressures and means for subtracting such braking pressures from each corresponding axle braking pressure calculated to meet a driver's braking demand.

9. A system according to claim 1, including means for selecting vehicle drive line torque as said source of background braking.

10. A system according to claim 9, including torque sensing means mounted around a drive shaft of the vehicle for measuring said drive line torque.

11. A system according to claim 9, including means for measuring reaction forces at an engine mounting to provide said measurement of drive line torque.

12. A system according to claim 1, for use in a hydraulic braking system of a vehicle having a transversely mounted engine and front wheel drive, including hydraulic valve means disposed in a hydraulic circuit leading to the front brakes and adapted to respond to reaction of the engine on its mountings when the engine is in overrun operation so as to reduce the hydraulic pressure supplied to the front brakes in dependence upon engine overrun torque.

13. A system for achieving improvements to braking distribution in a multiple-axle vehicle having electronically controlled braking system which includes foundation brakes operated in response to a foot pedal and which is subjected in use to plural sources of background braking effect which results in the vehicle experiencing a corresponding background braking force, comprising:

means for measuring the total-background braking force resulting from said sources of background braking in the vehicle; and allocation means for dividing said measured total background braking force in a predetermined proportion between said multiple axles of the vehicle, so that the respective axles are braked in consideration of the divided background braking force.

* * * * *